2,844,626
PROCESS FOR THE MANUFACTURE OF ADIPIC ACID

Jonas Kamlet, New York, N. Y., assignor to The Goodyear Tire & Rubber Company, a corporation of Ohio No Drawing. Application May 27, 1955
Serial No. 511,796

4 Claims. (Cl. 260—537)

This invention relates to a process for the manufacture of adipic acid. More particularly, this invention relates to improvements in the process for the manufacture of adipic acid by the oxidation of cyclohexanol, cyclohexanone and mixture of the two, with nitric acid. It has for its purpose to provide an improved process for the manufacture of adipic acid whereby the recovery and recycling of the nitric acid oxidizing agent is materially simplified, and the loss of nitric acid in said oxidation process is materially lowered.

Numerous processes have been described heretofore for the manufacture of adipic acid by the oxidation of cyclohexanol or cyclohexanone, with nitric acid in the presence or absence of metallic compound-based oxidation catalyst (Meier, U. S. Patent 2,300,955 (1942); Hamblet, U. S. Patent 2,439,513 (1948); Cavanaugh and Nagle, U. S. Patent 2,343,534 (1944); Hamblet, U. S. Patent 2,557,282 (1951); Riedel A.-G., British Patent 265,959 (1926); Schrauth, U. S. Patent 1,921,101 (1933); Perkins and Dietzler, U. S. Patent 1,960,211 (1934); Curtin, U. S. Patent 2,617,835 (1952); Rhodes, Bureau of Mines I. C. 7490 (1949), 52; Houilleres du Bassin du Nord, French Patent 981,609 (1951)). These processes usually involve the addition of cyclohexanol, cyclohexanone, or a mixture of the two compounds, to aqueous nitric acid of concentration between 45% and 90%, or the simultaneous mixing of these reagents, with cooling, to maintain the temperature below 70° to 80° C. An exothermic reaction occurs, with a copious evolution of nitrous fumes and some carbon dioxide. The nitrous gases, chiefly NO and $NO_2$, are passed to a nitric acid recovery system where, in admixture with air, they are converted by the processes well known to the art to nitric acid. The oxidation reaction mixture, after the conclusion of the oxidation, is cooled to 5° to 20° C., and the adipic acid which crystallizes out, is filtered or centrifuged off and thus recovered for purification. The filtrate from this adipic acid recovery, comprising a nitric acid solution, is usually mixed with the nitric acid obtained by the recovery, oxidation and adsorption in water of the nitrous gases evolved in the oxidation (said recovery being effected in a separate system), and with a further amount of fresh, "make-up" nitric acid to compensate for irretrievable losses of nitric acid, to regenerate the oxidizing agent required for the conversion of succeeding batches of cyclohexanol or cyclohexanone to adipic acid.

Numerous catalysts have been described as improving the yields of adipic acid obtained in this process. These are usually compounds of vanadium, manganese or copper, although a very extensive group of heavy metal compounds may be so employed to catalyze this reaction. However, the use of a catalyst in this reaction is optional since good yields may usually be obtained even without the use of catalysts. Thus, the oxidation of cyclohexanol with 54% nitric acid in the absence of catalysts at a temperature of 65° C. to 70° C. gives an 86% of theoretical yield of adipic acid; the oxidation of cyclohexanol with 68% nitric acid in the presence of a manganous acetate catalyst at 40° C. to 45° C. gives an 88% of theoretical yield of adipic acid.

While the oxidation of cyclohexanol and cyclohexanone with nitric acid in the presence or absence of catalysts, converts most of the nitric acid consumed to nitric oxide (NO) and nitrogen dioxide ($NO_2$), both of which can be converted, by absorption in water in the presence of oxygen or air, to nitric acid and are thus recovered and recycled in the process, there is a major element of irretrievable loss of nitric acid. A considerable part of the nitric acid is converted to nitrous oxide ($N_2O$) and elemental nitrogen, neither of which is readily or simply recoverable and convertible to nitric acid. This loss of nitric acid varies from 1.6 kgs. to 3.5 kgs. of nitric acid (100% $HNO_3$ equivalent) per kilogram of adipic acid manufactured and represents a major item of cost in the industrial process for the manufacture of this compound.

Another disadvantage of the present day processes for the manufacture of adipic acid by the nitric acid oxidation of cyclohexanol or cyclohexanone is that they require separate and discrete nitric acid recovery systems. The recovery of NO and $NO_2$ from the by-product gases obtained from the oxidation, their conversion to nitric acid, absorption, concentration and recycling to the process involve additional plant costs, installation, handling and processing costs and labor.

It is the further purpose of this invention to provide a simplified process for the manufacture of adipic acid from cyclohexanol, cyclohexanone and mixtures of the two compounds whereby (a) the irretrievable consumption of nitric acid may be considerably lessened and (b) the recovery, reconstitution and recycling to the process of the nitric acid oxidant may be materially simplified.

The raw materials for this process are cyclohexanol and cyclohexanone and mixtures of the two compounds. As is well known, cyclohexanol may be made by the hydrogenation of phenol and cyclohexanone may be made by the dehydrogenation or oxidation of cyclohexanol. Mixtures of cyclohexanol and cyclohexanone may also be prepared by the oxidation of cyclohexane with oxygen or an oxygen-containing gas, usually in the presence of a catalyst and at advanced temperatures and pressures (Loder, U. S. Patents 2,223,493–4 (1940); Hamblet, U. S. Patent 2,439,513 (1948); Porter and Cosby, U. S. Patent 2,565,087 (1951); Hamblet, U. S. Patents 2,557,281–2 (1951); Wadsworth, U. S. Patent 2,589,648 (1952); Publication Board Reports 112,062T; 576; 102,-058; 566; 25,607; 70,393; 6729 and 63,376). After distilling off the unreacted cyclohexane, the mixtures of cyclohexanol and cyclohexanone, obtained by this oxidation of cyclohexane, are ideally suitable for use as starting materials for the manufacture of adipic acid by the process of my invention. It must be understood that such mixtures of cyclohexanol and cyclohexanone (obtained by the oxidation of cyclohexane) also contain minor amounts of other related compounds, such as cyclohexanyl cyclohexyl ether, cyclohexyl esters, cyclohexandiol-1,2, some adipic acid, adipaldehydic acid, omega-hydroxycaproic acid and omega-caprolactone. All of these concomitant minor components of the product obtained by the oxidation of cyclohexane are oxidized under the same conditions as obtained for the oxidation of the cyclohexanol-cyclohexanone mixture smoothly and in good yield to adipic acid. Thus, the presence of other components in the cyclohexanol or cyclohexanone or mixture of the two compounds obtained by the oxidation of cyclohexane in no way interferes with the conversion of these compounds to adipic acid by the process of this invention.

Thus, the basic raw materials for the process of my present invention are phenol or cyclohexane, both of which are inexpensive and readily available compounds in adequate industrial supply.

The basis of my invention is the finding that good yields of adipic acid may be obtained, the irretrievable loss of nitric acid as nitrous oxide ($N_2O$) may be minimized and the recovery, regeneration and recycling of the nitric acid oxidant may be materially simplified by:

(a) Adding cyclohexanol, cyclohexanone or a mixture containing at least one of these compounds to aqueous nitric acid between 4N and 10N in concentration (252 to 630 gms. $HNO_3$ per liter) at a rate and with cooling so as to keep the temperature from rising above 80 C., and preferably between 60° C. and 70° C., (b) Effecting the said oxidation in the presence of an oxidation catalyst consisting of a compound of a metal chosen from the group consisting of vanadium, copper, manganese, cobalt, molybdenum, nickel, lead, chromium, iron and mercury, and preferably in the presence of a vanadium compound catalyst, and (c) Effecting the said oxidation in the presence of oxygen or an oxygen-containing gas introduced into the oxidation mixture at such a rate as to maintain the nitrogen oxides evolved substantially completely in the form of nitrogen dioxide ($NO_2$) and to maintain the presence of free oxygen in the system.

In the preferred embodiment of the process of this invention, cyclohexanol, cyclohexanone, or a mixture containing the two (whether derived from phenol or from cyclohexane) is added to an aqueous nitric acid solution, between 4 N and 10 N in concentration, at a rate and with cooling so as to maintain the temperature between 60° C. and 70° C., in the presence of a vanadium compound catalyst, while passing oxygen through the system at such a rate that the nitrous gases evolved are converted in situ to nitrogen dioxide ($NO_2$). The reaction is effected under an efficient, cooled reflux condenser, so that a considerable portion of the $NO_2$ and water vapor evolved in the course of this oxidation will recombine in the freeboard area of the oxidation vessel, to form nitric acid which will condense and reflux back into the reaction mixture. The uncondensed $NO_2$ and oxygen are then recirculated back to the reaction mixture, i. e. are pumped back though the reaction mixture of nitric acid, cyclohexanol, cyclohexanone and formed adipic acid. Thus, in a completely closed, circulating system, the $NO_2$ evolved, mixed with the added oxygen is continually circulated back to the reaction mixture where it will be converted back to nitric acid. By always maintaining the presence of free oxygen in the system, nitrous oxide ($N_2O$) and elemental nitrogen formation are minimized. Oxygen need be introduced into the system only to the extent and at the rate required to oxidize the NO and $NO_2$ in the system back to $HNO_3$. Since the system is completely enclosed, the overall result is to effect the oxidation of the cyclohexanol or cyclohexanone with oxygen, the nitric acid being the oxygen carrier which is regenerated and reconstituted in situ. As the reaction proceeds, some $N_2O$ and elemental nitrogen will commence to accumulate, and this must be purged or expelled from the system from time to time. Thus, the reaction may be effected at atmospheric or superatmospheric pressures, oxygen being introduced at a continuous rate so as to maintain at least a slight positive oxygen pressure in the system (e. g. 5 to 150 p. s. i.), and periodically purging the system of accumulated $N_2O$ and $N_2$. The oxygen may be bubbled through the reaction mixture (and may thus serve to maintain it in agitation), or it may be introduced into the freeboard area above the liquid reagents. The gaseous reagents ($NO_2$ and $O_2$) may be circulated through the reaction mixture by pumping or may be permitted to remain static within the reaction vessel, depending on the natural turbulence of the interaction of the gases to effect the necessary circulation, absorption and reaction.

While oxygen is the preferred reagent, other oxygen containing gases, such as air, may also be used with good results. When air is used as a circulating reagent it is necessary to purge or liberate the system much more frequently of accumulated inert gases (chiefly nitrogen from the air and $N_2O$ and nitrogen formed during the oxidation). Thus, air may be introduced into the system to maintain a positive pressure of 10 to 750 p. s. i., and when the oxidation is completed, the excess of inert gases may be purged or liberated from the system.

By continually passing oxygen, or an oxygen-containing gas such as air, through the reaction mixture and recirculating the gas mixture through the reaction mixture, or by continually maintaining the presence of free oxygen within the reaction system, the formation of nitrous oxide and nitrogen is minimized, the nitric acid oxidant is continuously regenerated in situ to a major extent and the necessity of a separate or discrete nitric acid recovery system is obviated.

The catalysts employed in the process of this invention may be chosen from among a wide group of compounds, such as the compounds of vanadium, copper, manganese, cobalt, molybdenum, nickel, lead, chromium, iron and mercury. The preferred compounds of these metals are the oxides, nitrates and acetates. Excellent results are obtained by the use of these catalysts in amounts varying from 0.01% to 0.5% based on the weight of the nitric acid solution employed. These proportions are by no means critical and may vary over a wide range. The preferred catalyst is vanadium pentoxide, or compounds yielding $V_2O_5$ (such as ammonium vandate) in amounts between 0.05% to 0.20% on the weight of the nitric acid solution employed.

At the conclusion of the oxidation, the reaction mixture is cooled rapidly to 5° C. to 20° C. and the copious precipitate of adipic acid which forms is filtered or centrifuged off. It is desirable to continue circulating the mixture of $NO_2$ and oxygen (or air) through the reaction mixture as it cools, to obtain most efficient recovery of $NO_2$ and conversion to nitric acid. However, to obtain the most efficient utilization of the oxidation vessel, it may be found desirable to cool the reaction mixture in a separate vessel, and to circulate any $NO_2$-oxygen gas mixture not absorbed in one batch through another or a succeeding batch of reaction product.

Other dibasic acids are formed as by-products of this oxidation, in minor amounts. These are chiefly glutaric, succinic and oxalic acids. Thus, as they accumulate in the reaction mixture, it may be necessary after several cycles to purge the system of the accumulated lower dibasic acids. This may be done by distilling off the nitric acid, and recovering the residue of crystalline dibasic acids. These may be separated by fractional crystallization from water or other solvents, and can represent a valuable series of by-products of this process.

By the process of this invention, the nitric acid is largely regenerated within the reactor, i. e. coincidental with the oxidation. After cooling and filtering (or centrifuging) off the adipic acid, the filtrate comprises a nitric acid solution of somewhat lower concentration than the original oxidant employed. By the addition of concentrated nitric acid, and water if required, this filtrate can be reconstituted to form a nitric acid solution of the volume and concentration originally used for the oxidation, and may be returned to the process for use in the oxidation of succeeding batches. The catalyst, of course, remains dissolved in the mother liquor and thus need not be replaced or replenished when the reconstituted nitric acid-containing filtrate is employed as oxidant for succeeding batches.

The adipic acid obtained by the process of this invention need only be recrystallized from hot water to give a product of high purity, melting at 151°–152° C. The yields obtained by this process are quite good—up to 90% to 95% of theoretical when cyclohexanol or cyclohexanone derived from phenol are used as raw materials.

When mixtures containing cyclohexanol and cyclohexanone derived by the oxidation of cyclohexane are employed, yields of up to 75% to 85% are obtained based on the cyclohexane actually consumed (i. e. the yield based on the amount of cyclohexane submitted to oxidation less the amount of cyclohexane recovered unoxidized).

The consumption of irretrievably lost nitric acid by the process of this invention is from 0.5 kg. to 0.75 kg. of nitric acid (as 100% $HNO_3$) as compared to a loss of 1.6 kgs. to 3.5 kgs. of 100% $HNO_3$, per kilo of adipic acid produced, by the processes of the prior art.

The following examples are given to define and to illustrate this invention, but in no way to limit it to reagents, proportions or conditions described therein. Obvious modifications will occur to any person skilled in the art. All proportions given are in parts by weight.

*Example I*

A glass-lined reactor, equipped with an efficient, tall, water-cooled reflux condenser, and a system for pumping oxygen through the system in a completely closed cycle is employed. The reactor is charged with 10,000 parts of 6 N nitric acid (38% $HNO_3$ or 27.5° Bé.) containing 15 parts of ammonium vanadate as a catalyst. Cyclohexanol (derived by the hydrogenation of phenol) is added to the well agitated reaction mixture at such a rate as to maintain the reaction mixture at a temperature between 60° C. and 70° C. Oxygen is bled into the closed system (at slowly rising pressures) until a total of 500 parts of oxygen have been introduced into the circulating gases over a period of three hours. The addition of a total of 1010 parts of cyclohexanol (10 moles) is thus effected at 60°–70° C. over a period of three hours, after which the reaction mixture is cooled rapidly to 5° C.–10° C., while continuing the circulating of the oxygen-$NO_2$ containing gases until they contain little or no $NO_2$. When the reaction mixture has been cooled to 5°–10° C., the copious precipitate of adipic acid is filtered off and washed with a little cold water. The combined filtrate and washings, after adding 695 parts of 95% nitric acid and diluting with water to 10,000 parts comprise the reconstituted oxidant of 6 N nitric acid for the next batch of cyclohexanol.

By this process, 1000 parts of adipic acid, m. pt. 151°–152° C. are obtained from 768 parts of cyclohexanol, 500 parts of nitric acid (100% $HNO_3$ equivalent) and 381 parts of oxygen.

*Example II*

A corrosion resistant autoclave, fitted with efficient cooling coils and an agitator, is employed. The reactor is charged with 12,000 parts of 5 N nitric acid (31.5% $HNO_3$ or 23° Bé.) containing 45 parts of cupric nitrate as a catalyst. The raw material employed for the oxidation is obtained by reacting cyclohexane with air at 5 atm. pressure at a temperature of 145°–150° C., until a portion thereof is oxidized, and thereafter distilling off the excess of unreacted cyclohexane. The residual oil contains 34% of cyclohexanol, 33% of cyclohexanone and 30% of other compounds, all of which are convertible by reaction with nitric acid to adipic acid (e. g. cyclohexanyl cyclohexyl ether, cyclohexyl esters, cyclohexandiol-1,2, adipic acid, adipaldehydic acid, omega-hydroxycaproic acid and omega-caprolactone). This oil is pumped into the autoclave at such a rate as to keep the temperature of the reaction mixture at 60° C. to 70° C. At the same time, air is pumped into the autoclave to maintain the pressure at about 300 p. s. i. After a total of 1000 parts of the cyclohexanol-cyclohexanone-containing oil has been added, and the temperature of the reaction mixture no longer rises it is cooled rapidly to 5°–10° C., and the precipitate of adipic acid is filtered off and processed as described in the first example.

By this process, 1000 parts of adipic acid, m. pt. 150°–151° C. are obtained from 755 parts of cyclohexane and 600 parts of nitric acid (100% $HNO_3$ equivalent).

Having described my invention, what I claim and desire to protect by Letters Patent is:

1. A process for the manufacture of adipic acid by the oxidation of at least one member of the group consisting of cyclohexanol and cyclohexanone which comprises the steps of adding (*a*) the compound to be oxidized and (*b*) an oxygen-containing gas to (*c*) an aqueous solution of nitric acid containing a catalytic amount of an oxidation catalyst comprising a compound of a metal selected from the group consisting of vanadium, copper, manganese, cobalt, molybdenum, nickel, lead, chromium, iron and mercury, said solution having a nitric acid concentration of from 4 N to 10 N, continuously cooling said solution and adding the compound to be oxidized at such a rate as to maintain the temperature of the reaction mixture between 60° C. and 70° C., adding said oxygen-containing gas in an amount in excess of that required to oxidize the oxides of nitrogen produced substantially to nitrogen dioxide and continually circulating the gases through the reaction mixture.

2. A process for the manufacture of adipic acid by the oxidation of at least one compound selected from the group consisting of cyclohexanol and cyclohexanone which comprises simultaneously adding air and the compound to be oxidized to a nitric acid solution in the presence of a compound of a metal selected from the group consisting of vanadium, copper, manganese, cobalt, molybdenum, nickel, lead, chromium, iron and mercury, said nitric acid solution being maintained at a concentration of from 4 N to 10 N, cooling said solution to maintain the temperature of the mixture between 60° C. and 70° C. and maintaining free oxygen in the system.

3. A process for the manufacture of adipic acid which comprises adding at least one compound selected from the group consisting of cyclohexanol and cyclohexanone to an aqueous nitric acid solution in the presence of a vanadium compound in a closed system, said nitric acid solution having a concentration of from 4 N to 10 N, and maintaining the temperature of the reaction mixture between 60° C. and 70° C. by cooling the mixture and controlling the rate of addition of the compound to be oxidized, introducing oxygen continuously to maintain the pressure in the system in the range of from 5 to 150 p. s. i. and periodically purging the system of inert gas including nitric oxide and nitrogen.

4. A process for the manufacture of adipic acid which comprises treating cyclohexanol in a closed system with 6 N nitric acid containing .15% of ammonium vanadate, based on the weight of nitric acid used, continuously adding cyclohexanol at such a rate as to maintain the reaction mixture at 60° C. to 70° C., continuously introducing oxygen into the system and circulating gases through the system, cooling the reaction mixture to 5° C. to 10° C., continuing the circulation of the oxygen-nitrous, oxide-containing gases until the nitrous oxide is oxidized and separating the adipic acid formed.

References Cited in the file of this patent

UNITED STATES PATENTS

| | | |
|---|---|---|
| 2,193,562 | McAllister et al. | Mar. 12, 1940 |
| 2,298,387 | Kenyon et al. | Oct. 13, 1942 |
| 2,662,908 | Logan | Dec. 15, 1953 |

FOREIGN PATENTS

| | | |
|---|---|---|
| 567,525 | Great Britain | Feb. 19, 1945 |